United States Patent
Chang

(10) Patent No.: US 9,779,011 B2
(45) Date of Patent: Oct. 3, 2017

(54) TESTING SYSTEM

(71) Applicant: Primax Electronics Ltd., Neihu, Taipei (TW)

(72) Inventor: Pei-Ming Chang, Taipei (TW)

(73) Assignee: PRIMAX ELECTRONICS LTD., Neihu, Taipei (TW)

( * ) Notice: Subject to any disclaimer, the term of this patent is extended or adjusted under 35 U.S.C. 154(b) by 10 days.

(21) Appl. No.: 14/992,834

(22) Filed: Jan. 11, 2016

(65) Prior Publication Data

US 2017/0139810 A1    May 18, 2017

(30) Foreign Application Priority Data

Nov. 13, 2015    (TW) .............................. 104137531 A

(51) Int. Cl.
G06F 11/00    (2006.01)
G06F 11/36    (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
USPC ......................................................... 714/38.1
See application file for complete search history.

(56) References Cited

U.S. PATENT DOCUMENTS

| 2006/0143596 A1* | 6/2006 | Miyashita | G06F 8/433 717/131 |
| 2013/0047140 A1* | 2/2013 | Shann | G06F 11/3664 717/128 |
| 2013/0173526 A1* | 7/2013 | Wong | H04N 21/458 706/54 |

\* cited by examiner

*Primary Examiner* — Sarai Butler
(74) *Attorney, Agent, or Firm* — Kirton McConkie; Evan R. Witt

(57) ABSTRACT

The present invention relates to a testing system, including a testing host and a relay host, where the testing host may test a tested target, and a testing program is installed in the testing host. In a process of testing the tested target, the testing program may generate testing history information of the tested target, and the testing host changes a file name of the testing history information according to a renaming rule. The relay host includes a default function and a transferring and processing program, where the transferring and processing program may capture testing content information applicable to the default function from the file name of the testing history information, and apply the testing content information to the default function to generate function data. Therefore, an operation of generating the function data may be simplified.

10 Claims, 4 Drawing Sheets

TESTING SYSTEM

FIELD OF THE INVENTION

The present invention relates to a testing system, and in particular, to a testing system for an electronic device or an electronic element inside the electronic device.

BACKGROUND OF THE INVENTION

With the development of science and technology, electronic devices have been popularized to individual users, common electronic devices include portable electronic devices such as a desktop computer, a notebook computer, and a mobile phone, and peripheral input apparatuses of the electronic devices may be used in cooperation with the electronic devices, so as to improve convenience of operating the electronic devices. The peripheral input apparatuses include a mouse, a keyboard, a touch pad, and the like.

An electronic element and a circuit board are disposed inside both an electronic device and a peripheral input apparatus of the electronic device, to enable the electronic device and the peripheral input apparatus of the electronic device to operate by means of a circuit on the circuit board and the electronic element. In a process of manufacturing the electronic device or the peripheral input apparatus of the electronic device, a manufacturer of the electronic device or the peripheral input apparatus of the electronic device needs to perform a test, so as to ensure that functions of the electronic device or the peripheral input apparatus of the electronic device are normal. After the electronic device or the peripheral input apparatus of the electronic device passes the test, the manufacturer can deliver the electronic device or the peripheral input apparatus of the electronic device to a retailer.

On the other hand, the retailer of the electronic device or the peripheral input apparatus of the electronic device provides after-sale services of the electronic device such as a warranty service and a maintenance service, and therefore, when the electronic device is faulty or damaged, and the electronic device meets conditions of the after-sale services (for example, the electronic device is still within a warranty period of the electronic device), a consumer may enjoy the warranty service or maintenance service for free. Alternatively, when the electronic device is faulty or damaged, but the electronic device does not meet the conditions of the after-sale services (for example, the electronic device exceeds the warranty period of the electronic device, or the electronic device is faulty due to a human factor), the consumer can enjoy the warranty service or maintenance service only when the consumer bears whole or partial expense. The retailer performs evaluation and analysis on a faulty or damaged electronic element of the electronic device, and the evaluation and analysis of the retailer include reading testing history information provided by the manufacturer. Therefore, the manufacturer needs to provide the testing history information of testing the electronic device or the electronic element inside the electronic device to the retailer.

In the testing history information, detailed information in a process of testing a tested target is recorded. Generally, the testing history information at least includes related testing information such as tested target sequence number information, testing station information, testing result information, error code information, and testing date/time information of the tested target (for example, an electronic device or an electronic element inside the electronic device). Information content in the testing history information is considerably large in amount, and the retailer cannot read the information content one by one. Therefore, the retailer provides a function compiled by the retailer by using a program language to the manufacturer, and instructs the manufacturer to apply the information content in the testing history information to the function, so that corresponding function data may be generated. The function data may clearly show information content needed by the retailer, so that the retailer reviews the information content.

However, the program language used by the retailer is unnecessarily the same as a program language used by the manufacturer. If the program languages used by the retailer and the manufacturer are different, and a first program language (for example, a Labview language) used by the manufacturer cannot support a second program language (for example, an Objective C language) used by the retailer, a testing host, for testing a tested target, of the manufacturer cannot call a function compiled by using the second program language, causing a problem that function data needed by the retailer cannot be generated.

Therefore, a testing system that can support functions compiled by using different program languages is needed.

SUMMARY OF THE INVENTION

An object of the present invention is to provide a testing system that can support functions compiled by using different program languages is needed.

Another object of the present invention is to provide a testing system that can improve efficiency of generating function data.

In a preferred embodiment, the present invention provides a testing system, including a testing host and a relay host, where the testing host has a testing program, where the testing program is compiled by using a first specification program language, and when the testing host performs a testing operation on a tested target, the testing program generates corresponding testing history information, where the testing host changes a file name of the testing history information according to a renaming rule, and the file name includes testing content information of the testing history information. The relay host includes at least one default function and a transferring and processing program, where the at least one default function is installed in the relay host, and the at least one default function is compiled by using a second specification program language. The transferring and processing program can support the second specification program language, and is used for generating function data according to the testing content information in the file name after the testing history information is obtained, and outputting the function data to a server.

DETAILED DESCRIPTION OF THE PREFERRED EMBODIMENT

Figure 1:
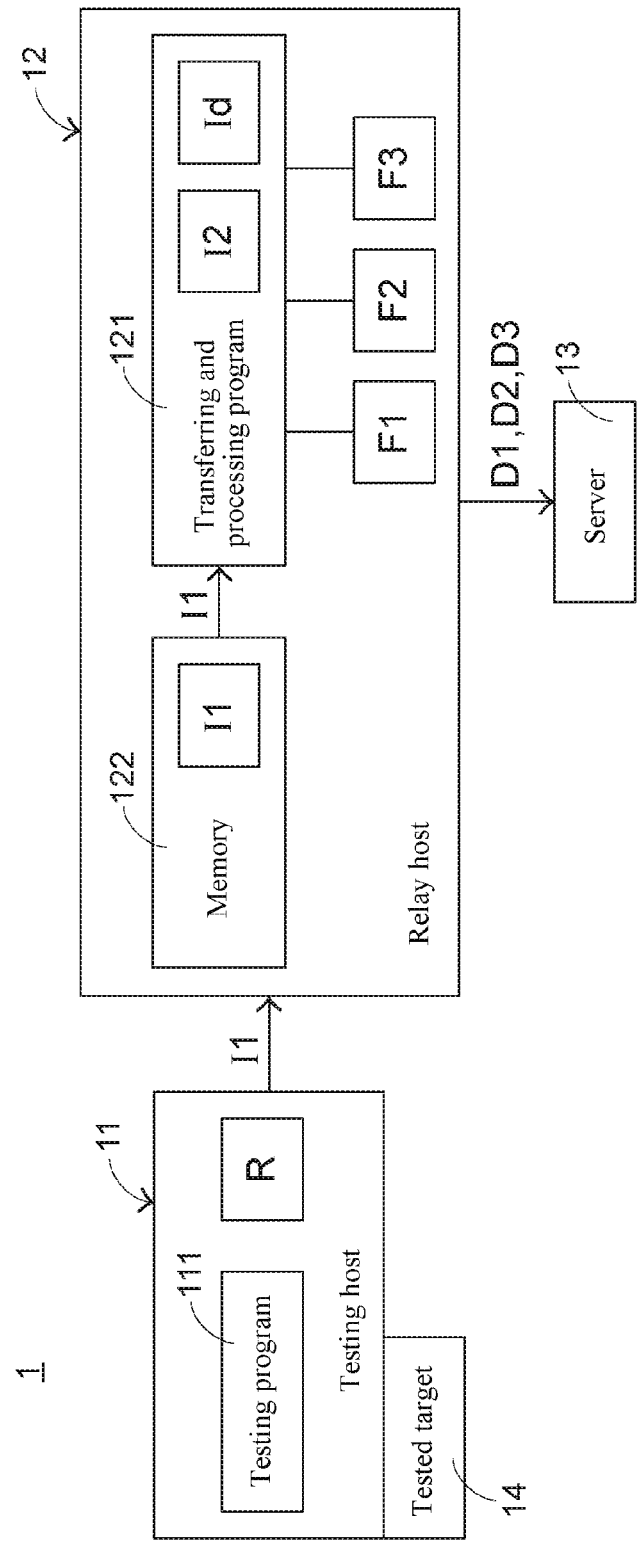
FIG. 1 is a schematic block diagram of a testing system according to the present invention in a first preferred embodiment.

In view of the problem in the prior art, the present invention provides a testing system that can resolve the problem in the prior art. An architecture of a testing system according to the present invention is first described. Refer to FIG. 1, which is a schematic block diagram of the testing system according to the present invention in a first preferred embodiment. The testing system 1 according to the present invention includes a testing host 11 and a relay host 12, the testing system 1 is connected to a server 13 provided by a retailer of an electronic device, and the server 13 is set up by the retailer, and has a function of receiving function data transferred by the testing system 1, so that the retailer reviews the function data transferred by the testing system 1. In the testing system 1, a function of the testing host 11 is to be connected to a tested target 14 and to perform a testing operation on the tested target 14, a testing program 111 is installed in the testing host 11, and the testing program 111 is compiled by using a first specification program language. A function of the testing program 111 is to control the testing host 11 to perform a testing operation on the tested target 14, and generate testing history information I1 corresponding to the testing operation during occurrence of the testing operation. In this preferred embodiment, the first specification program language is a Labview language, and the tested target 14 is various electronic devices or electronic elements inside the electronic devices.

On the other hand, the relay host 12 is connected to the testing host 11, and includes a plurality of default functions F1, F2, and F3, a transferring and processing program 121, and a memory 122, and the plurality of default functions F1, F2, and F3 is provided by the retailer and installed in the relay host 12, where the plurality of default functions F1, F2, and F3 is compiled by using a second specification program language, and the testing program 111 does not support the second specification program language, which indicates that the testing program 111 cannot call the plurality of default functions F1, F2, and F3. The transferring and processing program 121 is also installed in the relay host 12, and can support the second specification program language. In other words, the transferring and processing program 121 has a capability of calling the plurality of default functions F1, F2, and F3. A function of the transferring and processing program 121 is to generate a plurality of pieces of function data D1, D2, and D3 according to testing content information I2 in a file name of the testing history information I1 after the testing history information I1 is obtained, and output the plurality of pieces of function data D1, D2, and D3 to the server 13. After obtaining the testing history information I1, the transferring and processing program 121 first performs a determining mechanism corresponding to the plurality of default functions F1, F2, and F3, and decides, according to a result of the determining mechanism, how to generate the plurality of pieces of function data D1, D2, and D3. The memory 122 is connected to the transferring and processing program 121, and may store the testing history information I1 transferred by the testing host 11.

In this preferred embodiment, the second specification program language is an Objective C language, the relay host 12 may be connected to the testing host 11 in a manner of a physical line connection or a manner of a wireless connection (for example, a network connection), and the memory 122 is a hard disk.

Figure 2:
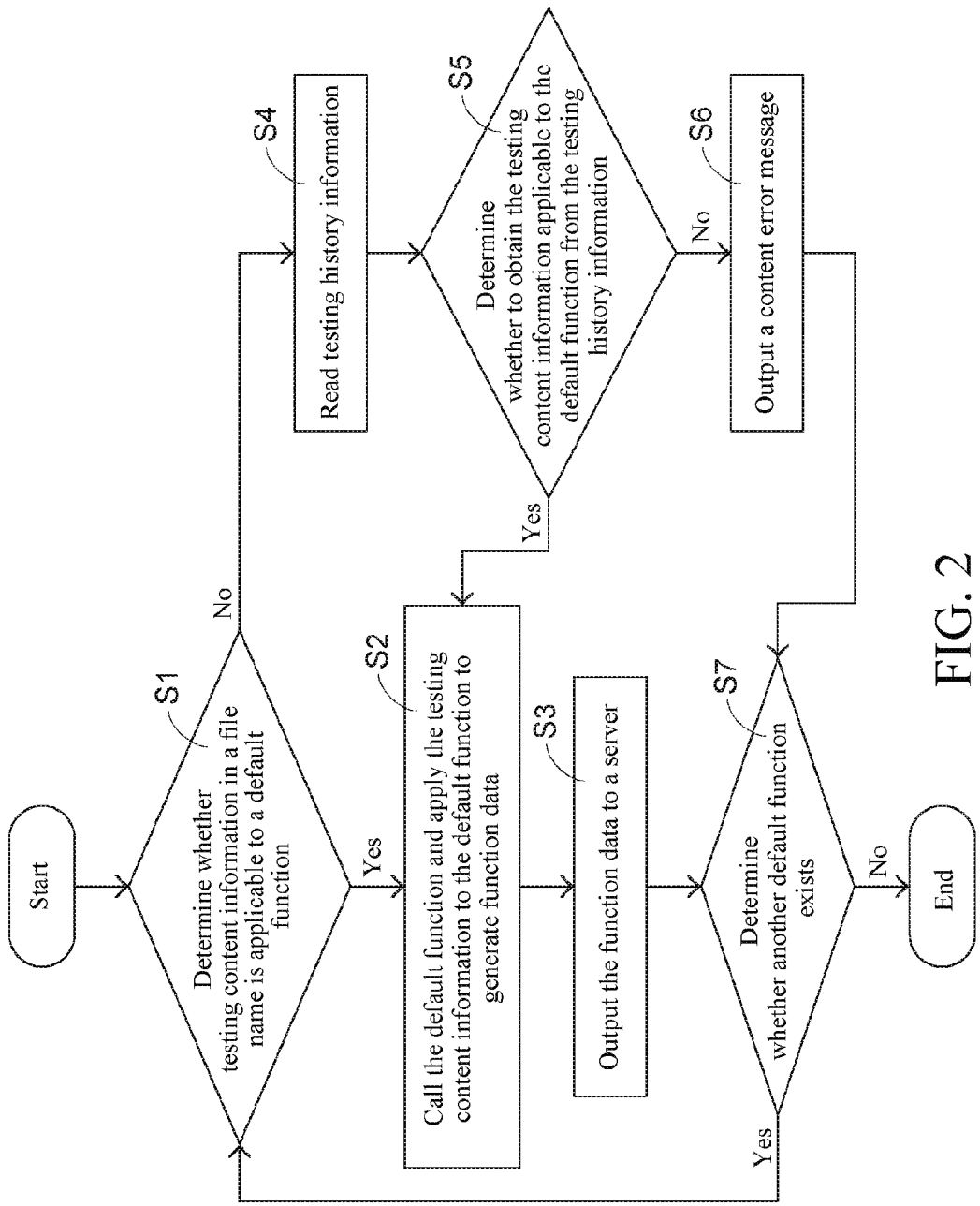
FIG. 2 is a block flowchart of a determining mechanism performed by a transferring and processing program of the testing system according to the present invention in the first preferred embodiment.

Next, the determining mechanism that corresponds to the plurality of default functions F1, F2, and F3 and is performed by the transferring and processing program 121 is described. Refer to FIG. 2, which is a block flowchart of a determining mechanism performed by a transferring and processing program of the testing system according to the present invention in the first preferred embodiment. The determining mechanism includes the following steps:

Step S1: Determine whether testing content information in a file name is applicable to a default function.

Step S2: Call the default function and apply the testing content information to the default function to generate function data.

Step S3: Output the function data to a server.

Step S4: Read testing history information.

Step S5: Determine whether to obtain the testing content information applicable to the default function from the testing history information.

Step S6: Output a content error message.

Step S7: Determine whether another default function exists.

In step S1, when it is determined that the testing content information is applicable to the default function, the transferring and processing program 121 performs step S2; otherwise, the transferring and processing program 121 performs step S4. In step S5, when it is determined that another piece of testing content information is applicable to the default function, the transferring and processing program 121 performs step S2; otherwise, the transferring and processing program 121 performs step S6. In step S7, when it is determined that another default function still exists, step S1 is again performed; otherwise, the determining mechanism is ended.

It should be particularly noted that there are two cases. Firstly, the testing history information I1 includes testing content information I2, the testing content information I2 is a related record about performing the testing operation on the tested target 14, and the testing content information I2 includes tested target sequence number information, testing station information, testing result information, error code information, and testing date/time information, so that testing personnel may be informed of a testing process of the tested target 14 and a result of the testing process according to the testing content information I2. Secondly, a testing content default value Id corresponding to the testing content information I2 is preset in the transferring and processing program 121, and the transferring and processing program 121 determines, by finding out through comparison whether the testing content information I2 and the testing content default value Id are same, whether the testing content information I2 is applicable to the default function. The testing content default value Id includes a sequence number default value corresponding to the tested target sequence number information, a testing station default value corresponding to the testing station information, a testing result default value corresponding to the testing result information, an error code default value corresponding to the error code default value, and a testing time default value corresponding to the testing time default value. Therefore, the foregoing determining mechanism is performed.

Next, an operation situation of the testing system 1 according to the present invention is described. Referring to both FIG. 1 and FIG. 2, at first, the testing host 11 and the tested target 14 may be connected manually or by using an automation device, and the testing program 111 controls the testing host 11 according to a default testing script to perform a testing operation on the tested target 14, so as to generate the corresponding testing history information I1, where the testing history information I1 includes the testing content information I2, and the testing history information I1 is a text file whose file name is, for example, LOG.txt. After the testing history information I1 is generated, the testing host 11 reads the testing content information I2 in the testing history information I1, and changes the file name of the testing history information I1 into a new file name according to a default renaming rule R. The renaming rule R is decided according to information needed by the plurality of default functions F1, F2, and F3.

Description is made by using an example. For example, information needed by the default function F1 is tested target sequence number information and testing result information, information needed by the default function F2 is tested target sequence number information, testing station information, testing result information, and error code information, and information needed by the default function F3 is tested target sequence number information, testing station information, and testing date/time information. What information is needed by the plurality of default functions F1, F2, and F3 may be known according to the above description; therefore, the renaming rule R is designed according to the needed information, so that the testing host 11 captures the needed tested target sequence number information, testing station information, testing result information, error code information, and testing date/time information from the testing content information I2 of the testing history information I1, and uses the information as a new file name of the testing history information I1.

Description is made by using an actual example: The file name of the testing history information I1 is changed from LOG.txt into a new file name ABCD123-ST01-FAIL-0011-20150120_113035, where "ABCD123" in the new file name is content of tested target sequence number information, and indicates a sequence number of a tested target. "ST01" is content of testing station information, and indicates a serial number of a testing station testing the tested target. "FAIL" is content of testing result information, and indicates that the tested target fails to pass the test. "0011" is content of error code information, and indicates a cause why the testing on the tested target fails. For example, a voltage value at which the testing is performed is excessively high. "20150120" is a testing date of the tested target, and "113035" is a testing time of the tested target. When the new file name of the testing history information I1 is EFGH789-ST03-PASS-0000-20150121_091530, "EFGH789" is content of tested target sequence number information, "ST03" is content of testing station information, "PASS" is content of testing result information, and indicates that the tested target has passed the test, "0000" is content of error code information, and indicates that the test is errorless, "20150121" is the testing date of the tested target, and "091530" is the testing time of the tested target.

After the change in the file name of the testing history information I1 is completed, the testing host 11 transfers the testing history information I1 to the relay host 12, and the testing history information I1 is stored in the memory 122. Next, the transferring and processing program 121 may obtain the testing history information I1 from the memory 122, and begin to perform the determining mechanism. First, the transferring and processing program 121 determines whether the testing content information I2 in the file name is applicable to the plurality of default functions F1, F2, and F3, that is, performs step S1. The transferring and processing program 121 captures the needed testing content information I2 from the file name of the testing history information I1. Specifically, the transferring and processing program 121 searches the file name of the testing history information I1 for a keyword conforming to the testing content default value Id, and captures the conforming keyword as the needed testing content information I2.

In step S1, the transferring and processing program 121 first makes a search in terms of the tested target sequence number information and the testing result information in the default function F1, and the transferring and processing program 121 searches a new file name ABCD123-ST01-FAIL-0011-20150120_113035 for a keyword conforming to the sequence number default value and the testing result default value in the testing content default value Id. After the search, the transferring and processing program 121 captures partial testing content information I2 applicable to the default function F1 such as ABCD123 and FAIL from the new file name. Next, the transferring and processing program 121 performs step S2: Call the corresponding default function F1 and apply the captured partial testing content information I2 to the default function F1, so as to generate the function data D1 corresponding to the default function F1. Next, the relay host 12 performs step S3: Transfer the function data D1 to the server 13 set up by the retailer.

After step S3 is completed, the transferring and processing program 121 performs step S7: Determine whether another default function exists. The default functions F2 and F3 that are not used still exist in the relay host 12; therefore, the transferring and processing program 121 performs step S1 again for the default function F2, and the transferring and processing program 121 generates function data D2 corresponding to the default function F2 by means of step S1 to step S3 that are similar to those in the foregoing, and transfers the function data D2 to the server 13. Next, the transferring and processing program 121 performs step S7, step S1, and step S2 to generate function data D3 corresponding to the default function F3, and transfers the function data D3 to the server 13. Finally, step S7 is performed and the determining mechanism is ended. In this case, the operation of the testing system 1 according to the present invention is completed. The foregoing is an operation situation in which the testing system 1 captures the partial testing content information I2 applicable to the default functions F1, F2, and F3 from the file name successfully.

It should be particularly noted that, in this preferred embodiment, an example in which each time a piece of function data is generated, the function data is immediately transferred to the server 13 is used, and is, however, only exemplary, and the present invention is not limited thereto. In another preferred embodiment, it may be also a case in which after a particular quantity of pieces of function data (for example, five pieces of function data) are generated, five pieces of function data are transferred to the server 13 once again.

The following describes an operation situation in which the testing system 1 cannot capture testing content information applicable to a default function from a file name. For example, a new file name, of the testing history information I1, obtained by the transferring and processing program 121 is CD12-ST01-FAIL-0011-20150120_113035. In step S1, the transferring and processing program 121 first makes a search in terms of the tested target sequence number information and the testing result information in the default function F1, and the transferring and processing program 121 searches a new file name CD12-ST01-FAIL-0011-

20150120_113035 for a keyword conforming to the sequence number default value and the testing result default value in the testing content default value Id. The new file name does not include a keyword conforming to the sequence number default value, and therefore the transferring and processing program 121 cannot capture partial testing content information I2, and performs step S4.

Step S4: The transferring and processing program 121 turns on the testing history information I1 and reads content of the testing history information I1. Next, the transferring and processing program 121 performs step S5: Obtain another piece of testing content information applicable to the default function F1 from the testing history information I1, that is, partial testing content information I2 such as ABCD123 and FAIL. Moreover, it is determined whether the another piece of testing content information is applicable to the default function F1. The partial testing content information I2 such as ABCD123 and FAIL is applicable to the default function F1, and therefore step S2 and step S3 that are the same as those in the foregoing are performed and the function data D1 corresponding to the default function F1 may be transferred to the server 13. Otherwise, if the another piece of testing content information obtained from the testing history information I1 is not applicable to the default function F1, the transferring and processing program 121 transfers a content error message M to the testing host 11, so as to instruct the testing host 11 to provide correct testing history information I1. Next, step S7 that is the same as that in the foregoing is performed, and a subsequent operation of step S7 is similar to that in the foregoing, and is not described again.

To sum up, the testing system 1 according to the present invention may design a renaming rule according to the plurality of default functions F1, F2, and F3 provided by the retailer, and the testing host 11 generates the testing history information I1 after the testing on the tested target 14 is completed, where the file name of the testing history information I1 is established according to the renaming rule. Next, the testing system 1 according to the present invention captures the needed testing content information I2 from the file name of the testing history information I1 by using the transferring and processing program 121, calls the plurality of default functions F1, F2, and F3, and may apply the partial testing content information I2 to the plurality of default functions F1, F2, and F3, so as to generate the corresponding function data D1, D2, and D3 sequentially. Finally, the relay host 12 transfers the function data D1, D2, and D3 to the server 13, so that the retailer reviews the function data D1, D2, and D3, and may be informed of information such as a testing result of the tested target.

Figure 3:
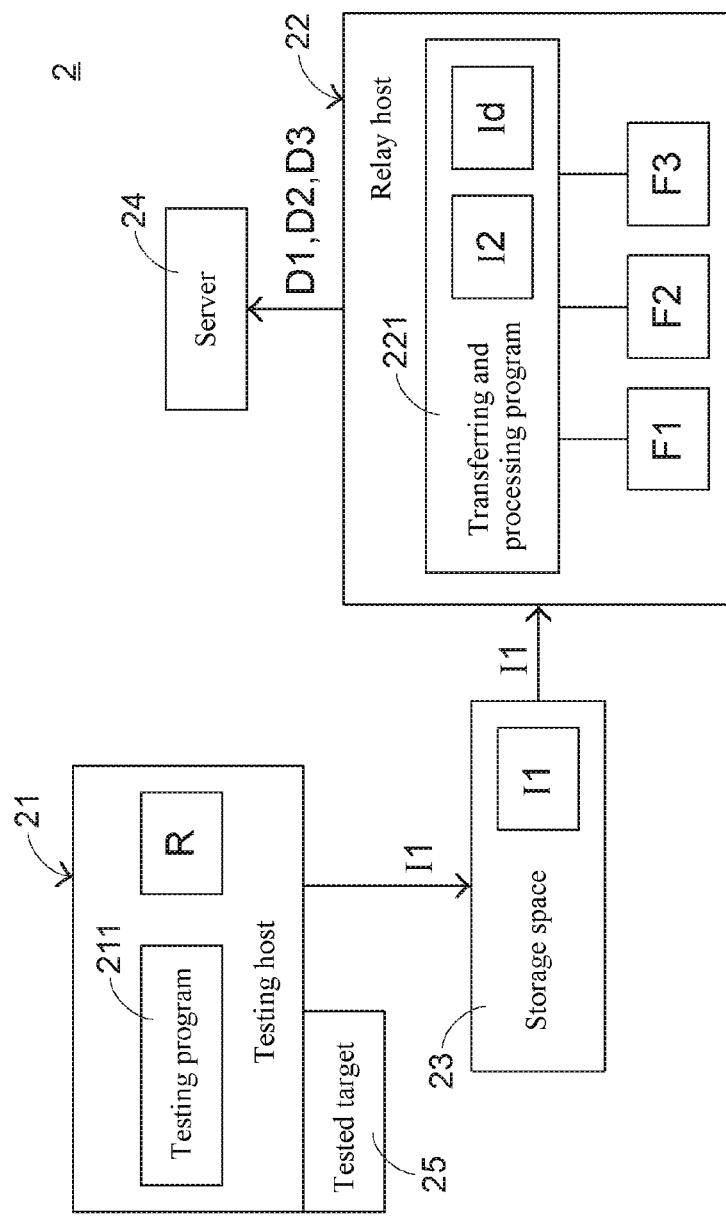
FIG. 3 is a schematic block diagram of a testing system according to the present invention in a second preferred embodiment.

Moreover, the present invention further provides a second preferred embodiment different from that in the foregoing. Refer to FIG. 3, which is a schematic block diagram of a testing system according to the present invention in the second preferred embodiment. The testing system 2 according to the present invention includes a testing host 21, a relay host 22, and a storage space 23, and the testing system 2 is connected to a server 24 provided by a retailer of an electronic device. In the testing system 2, a testing program 211 compiled by using a first specification program language is installed in the testing host 21, and the testing host 21 may be connected to a tested target 25 and perform a testing operation on the tested target 25. The relay host 22 includes a plurality of default functions F1, F2, and F3 and a transferring and processing program 221. A structure and a function of the testing system 2 of this preferred embodiment are basically the same as those in the foregoing first preferred embodiment, and similarities are not described again; however, there are differences: A first difference is that in this preferred embodiment, the storage space 23 replaces the memory 122 of the first preferred embodiment. A second different is that a determining mechanism of the transferring and processing program 221 of this preferred embodiment is slightly different.

The first difference is first described: In FIG. 3, the storage space 23 is in a network connection to the testing host 21 and the relay host 22, and has a function of storing testing history information I1 transferred by the testing host 21, so that the relay host 22 is in a network connection to the storage space 23, and obtains the testing history information I1 from the storage space 23. In this preferred embodiment, the storage space 23 is a network storage space on the Internet.

Figure 4:
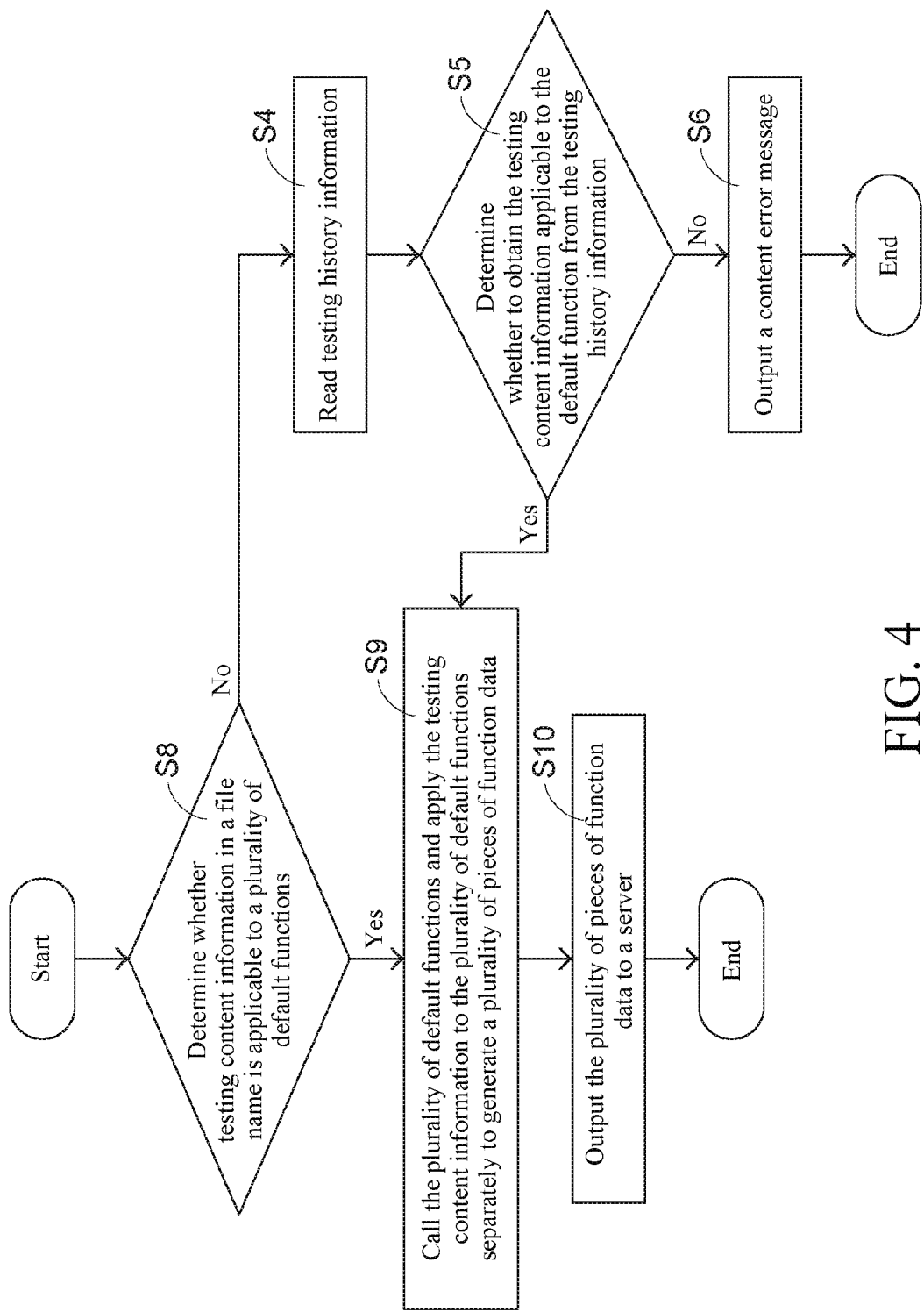
FIG. 4 is a block flowchart of a determining mechanism performed by a transferring and processing program of the testing system according to the present invention in the second preferred embodiment.

The second difference of the determining mechanism that corresponds to the plurality of default functions F1, F2, and F3 and is performed by the transferring and processing program 221 is then described. Refer to FIG. 4, which is a block flowchart of a determining mechanism performed by a transferring and processing program of the testing system according to the present invention in the second preferred embodiment. The determining mechanism includes the following steps:

Step S8: Determine whether testing content information in a file name is applicable to a plurality of default functions.

Step S9: Call the plurality of default functions and apply the testing content information to the plurality of default functions separately to generate a plurality of pieces of function data.

Step S10: Output the plurality of pieces of function data to a server.

Step S4: Read testing history information.

Step S5: Determine whether to obtain the testing content information applicable to the default function from the testing history information.

Step S6: Output a content error message.

In step S8, when it is determined that the testing content information is applicable to the plurality of default functions, the transferring and processing program 221 performs step S9; otherwise, the transferring and processing program 221 performs step S4. In step S5, when it is determined that another piece of testing content information is applicable to the default function, the transferring and processing program 121 performs step S9; otherwise, the transferring and processing program 221 performs step S6.

In short, step S8 of this preferred embodiment corresponds to step S1 of the first preferred embodiment, step S9 of this preferred embodiment corresponds to step S2 of the first preferred embodiment, and step S10 of this preferred embodiment corresponds to step S3 of the first preferred embodiment. A difference between this preferred embodiment and the first preferred embodiment only lies in that, in the first preferred embodiment, there is a step of performing the determining mechanism for only one default function each time, but in this preferred embodiment, there is a step in which the transferring and processing program 221 performs the determining mechanism for a plurality of default functions F1, F2, and F3 at the same time, and therefore a computing capability of the relay host 21 of this preferred embodiment needs to be relatively strong.

It can be known according to the above description that, the testing system according to the present invention designs a renaming rule in advance according to a default function provided by a retailer, and performs a renaming operation on testing history information generated by a testing host after testing on a tested target is completed, so as to display testing content information of the tested target in a file name of the testing history information. When a relay host obtains the testing history information, a transferring and processing program may directly capture needed testing content information from the file name of the testing history information, call the default function, and apply partial testing content information to the default function, so as to generate corresponding function data. Therefore, the relay host may rapidly generate the function data needed by the retailer without needing to read content of the testing history information, so as to improve efficiency of generating function data, and moreover, may resolve a problem that the testing host cannot call the default function provided by the retailer.

The above descriptions are merely preferred embodiments of the present invention, but not intended to limit the claims of the present invention. Therefore, any other equivalent changes or modifications made without departing from the spirit disclosed in the present invention should fall within the claims of this application.

What is claimed is:

1. A testing system, which performs a testing operation on a tested target and transfers function data corresponding to a testing history information of the testing operation to a server, comprising:
    a testing host, which executes a testing program to perform a testing operation on the tested target and to generate the testing history information, wherein the tested target is an electronic device or an electronic element of an electronic device, wherein the testing program is compiled by using a first specification program language, and wherein the testing host changes a file name of the testing history information according to a renaming rule, and the file name comprises testing content information of the testing history information; and
    a relay host, which generates and transfers the function data corresponding to the testing history information to the server, wherein the relay host executes a transferring and processsing program to generate the function data according to the testing content information in the file name and transfers the function data to the host, wherein the function data is defined by at least one default function installed in the relay host and is compiled by using a second specification program language and the transferring and processing program supports the second specification program language.

2. The testing system according to claim 1, further comprising: a storage space, in a network connection to the testing host and the relay host, and used for storing the testing history information transferred by the testing host, wherein the relay host can obtain the testing history information from the storage space.

3. The testing system according to claim 1, wherein the relay host further comprises a memory, connected to the transferring and processing program, and used for storing the testing history information transferred by the testing host, wherein the transferring and processing program can read the testing history information from the memory.

4. The testing system according to claim 1, wherein after the transferring and processing program obtains the testing history information, the transferring and processing program determines whether the testing content information is applicable to the at least one default function; when the transferring and processing program determines that the testing content information in the file name is applicable to the at least one default function, the transferring and processing program calls the at least one default function, applies the testing content information to the at least one default function to generate the function data, and outputs the function data to the server; and when the transferring and processing program determines that the testing content information in the file name is not applicable to the at least one default function, the transferring and processing program reads the testing history information, and obtains another piece of testing content information applicable to the at least one default function from the testing history information.

5. The testing system according to claim 4, wherein after the transferring and processing program obtains the another piece of testing content information applicable to the at least one default function from the testing history information, the transferring and processing program calls the at least one default function, applies the another piece of testing content information to the at least one default function to generate the function data, and outputs the function data to the server.

6. The testing system according to claim 4, wherein the transferring and processing program has a testing content default value corresponding to the testing content information, and the transferring and processing program determines, by finding out through comparison whether the testing content information and the testing content default value are same, whether the testing content information is applicable to the at least one default function.

7. The testing system according to claim 6, wherein the testing content information comprises at least one of tested target sequence number information, testing station information, testing result information, error code information, and testing date/time information, and the testing content default value of the transferring and processing program comprises at least one of a sequence number default value, a testing station default value, a testing result default value, an error code default value, and a testing time default value; and the sequence number default value corresponds to the tested target sequence number information, the testing station default value corresponds to the testing station information, the testing result default value corresponds to the testing result information, the error code default value corresponds to the error code information, and the testing time default value corresponds to the testing date/time information.

8. The testing system according to claim 7, wherein when the transferring and processing program determines, by finding out through comparison that the testing content information and the testing content default value are same, that the testing content information is applicable to the at least one default function, the transferring and processing program can apply at least one of the tested target sequence number information, the testing station information, the testing result information, the error code information and the testing date/time information in the testing content information to the at least one default function according to the at least one default function to generate at least one piece of corresponding function data, and output the at least one piece of function data and the testing history information to the server.

9. The testing system according to claim 4, wherein when the transferring and processing program obtains the testing history information, the transferring and processing program captures the needed testing content information from the file name of the testing history information.

10. The testing system according to claim 9, wherein the transferring and processing program can search the file name of the testing history information for a keyword conforming to the testing content default value, and capture the keyword as the needed testing content information.

\* \* \* \* \*